United States Patent
Herbert et al.

(10) Patent No.: US 9,690,401 B2
(45) Date of Patent: Jun. 27, 2017

(54) METHOD AND SYSTEM FOR MAINTAINING ASPECT RATIO ON POINTING DEVICES

(71) Applicant: Citrix Systems, Inc., Fort Lauderdale, FL (US)

(72) Inventors: Jennifer Rachel Herbert, Cambridge (GB); Steven Meisner, Nashua, NH (US); Sheetal Harsh Puri, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 223 days.

(21) Appl. No.: 14/223,680

(22) Filed: Mar. 24, 2014

(65) Prior Publication Data
US 2015/0268740 A1 Sep. 24, 2015

(51) Int. Cl.
*G09G 5/00* (2006.01)
*G06F 3/038* (2013.01)
(Continued)

(52) U.S. Cl.
CPC .......... *G06F 3/038* (2013.01); *G06F 3/04812* (2013.01); *G06T 3/40* (2013.01)

(58) Field of Classification Search
CPC .... G06F 3/04817; G06F 3/0485; G06F 3/167; G06F 1/1624; G06F 1/1637; G06F 1/1643; G06F 1/1671; G06F 1/1692; G06F 2200/1637; G06F 2203/04801; G06F 3/0202; G06F 3/0325; G06F 3/0421; G06F 3/0425; G06F 3/017; G06F 19/3406; G06F 19/321; G06F 21/84; G06F 2203/04805;
(Continued)

(56) References Cited

U.S. PATENT DOCUMENTS 7,379,031 B2 * 5/2008 Emerson et al. ............... 345/2.1
8,310,445 B2 * 11/2012 Sato ............................. 345/157
(Continued)

FOREIGN PATENT DOCUMENTS

WO WO 2012/048007 A2 4/2012
WO WO 2012/135256 A2 10/2012

OTHER PUBLICATIONS

International Search Report and Written Opinion dated Dec. 2, 2014; issued in related PCT Application PCT/US2014/033685 filed Apr. 10, 2014.

*Primary Examiner* — Duc Dinh
(74) *Attorney, Agent, or Firm* — Finnegan, Henderson, Farabow Garrett & Dunner, LLP

(57) ABSTRACT

A first computing device is provided for optimizing motion of a pointer associated with a pointing device. The first computing device can include one or more processors configured to provide a first virtual machine. The first virtual machine can be configured to obtain at least one of a first attribute and a second attribute, relating to a display area, and determine, based on at least one of the first attribute and the second attribute, at least one of a first scaling factor and a second scaling factor. The first virtual machine can be further configured to optimize a motion of the pointer based on at least one of the first scaling factor and the second scaling factor, and provide information corresponding to the optimized motion of the pointer to the second virtual machine.

30 Claims, 7 Drawing Sheets

(51) Int. Cl.
*G06F 3/0481* (2013.01)
*G06T 3/40* (2006.01)
(58) Field of Classification Search
CPC ............. G06F 2221/2105; G06F 3/033; G06F 3/0481; G06F 2221/0737; G06F 19/12; G06F 3/03543; G06F 11/261; G06F 19/3418; G06F 21/554; G06F 2203/0383
USPC .................... 345/156–169, 173–175, 1.1–2.3
See application file for complete search history.

(56) References Cited

U.S. PATENT DOCUMENTS

| | | | |
|---|---|---|---|
| 2006/0033712 A1* | 2/2006 | Baudisch et al. ............. | 345/157 |
| 2011/0141124 A1* | 6/2011 | Halls ........................ | G06F 21/83 |
| | | | 345/522 |
| 2012/0274558 A1* | 11/2012 | Broms et al. ................. | 345/157 |

* cited by examiner

METHOD AND SYSTEM FOR MAINTAINING ASPECT RATIO ON POINTING DEVICES

BACKGROUND

Virtualization technologies have become widely used for sharing limited computer hardware resources. In a hardware virtualization environment, sometimes also referred to as a platform virtualization environment, one or more virtual machines can simulate a host computer with its own operating system. In particular, software executed on these virtual machines can be separated from the underlying hardware resources. As a result, virtual machines running on a same host computer can each have its own operating system. For example, a computer that is running a Microsoft Windows™ operating system may host a virtual machine that simulates a computer running a Linux operating system, based on which Linux-based software can be executed.

In a virtualization environment, desktops of multiple virtual machines can be displayed on display devices in a variety of manners. For example, screen elements of multiple virtual machines can be displayed on a same display device or can be displayed on separate display devices. A user can use one set of input devices, such as a keyboard, a mouse, and a stylus, to control multiple virtual machines, whether they are displayed on one display device or separate display devices. For example, a user can use a mouse to move a pointer generated by the mouse from one screen associated with one virtual machine to another screen associated with another virtual machine.

When a user moves a pointer from one display device to another, the virtual machines associated with the display devices need to determine the positions of the pointer. The positions of the pointer can often be determined by using absolute coordinates or relative coordinates. An absolute coordinate system can provide exact positions of the pointer; and a relative coordinate system can provide the amount of relative movement of the pointer from its previous position. In an absolute coordinate system, most input devices are not capable of obtaining information regarding the dimensions or coordinate system of the particular display device that is associated with it. As a result, the operating system of the virtual machine scales the input pointer area or coordinates to match the display-device dimensions. Such scaling can cause velocity distortion of the motion of the pointer.

In particular, in an absolute coordinate system, when the input pointer area has a different aspect ratio from that of an associated display device (e.g. a tablet screen), the operating system scales the input pointer area to match both the x-axis and y-axis of the display device. For example, a default input pointer area can have an aspect ratio of 1:1 (in width and height, the same below). When such default input pointer area relates to a display device that has an aspect ratio of 16:10 (e.g., aspect ratio of an Android Tablet screen), the operating system scales the default input pointer area to match the aspect ratio of 16:10. As a result of the scaling, the motion of the pointer along the x-axis can have a visibly different velocity (e.g., a higher speed) than that along the y-axis. Such a skewed scaling can cause difficulty for the user to use the input device. An alternative to such skewed scaling is to scale uniformly across the x-axis and the y-axis. The uniform scaling, however, can result in a reduced operating area. Therefore, Microsoft Windows™ operating system often times uses the skewed scale as a default.

While a relative coordinate system can mitigate or avoid the above described scaling difficulties associated with the absolute coordinate system, the relative coordinate system can require synchronization among multiple virtual machines to determine the positions of the pointer. As described above, multiple virtual machines can be controlled by one set of input devices on one display device or on separate display devices. Therefore, synchronization can be required if the input device is associated with several separate display devices or if the input device is associated with one display device that is shared by multiple virtual machines. Synchronization can be performed by one of the multiple virtual machines that the input device is associated with (e.g., a mouse-orchestrating virtual machine). For example, a mouse-orchestrating virtual machine can receive relative coordinates corresponding to relative mouse movement events, convert the relative coordinates to absolute coordinates, and transmit the absolute coordinates to the other virtual machines. The mouse-orchestrating virtual machine can be the virtual machine that is displayed on the particular display device on which the mouse pointer is present. The mouse-orchestrating virtual machine can also be a dedicated virtual machine for synchronization.

If the mouse-orchestrating virtual machine is the virtual machine that is displayed on the particular display device on which the mouse pointer is present, motion of the pointer can have inconsistent velocity across different virtual machines due to the differences of virtual machines. Moreover, one or more virtual machines can likely cause failure to cooperate with the other virtual machines. For example, such failure can cause the mouse to become "stuck" in one virtual machine. Further, malicious software can infect one or more of the virtual machines. For example, malicious software can utilize the interface provided by the infected virtual machine to interact with other virtual machines, therefore potentially compromising the security of other virtual machines as well.

If the mouse-orchestrating virtual machine is a dedicated virtual machine for synchronization of the pointer generated by a pointing device, the mouse-orchestrating virtual machine receives relative coordinates corresponding to the relative movements of the pointer provided by a target virtual machine (i.e., the virtual machine that is displayed on the particular display device on which the mouse pointer is present). The mouse-orchestrating virtual machine can convert the relative coordinates to absolute coordinates and transmit the absolute coordinates to the target virtual machine. The input pointer area, however, can have a different aspect ratio from that of the display device associated with the target virtual machine. As a result, converting the relative coordinates to absolute coordinates can cause the similar difficulty that the velocities across the x-axis and the y-axis are visibly different.

BRIEF DESCRIPTION OF THE DRAWINGS

Reference will now be made to the accompanying drawings showing example embodiments of this disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide technologies for optimizing motion of a pointer associated with a pointing device for operating one or more virtual machines. The optimization techniques described herein can obtain dimensions of display devices that are associated with one or more virtual machines; determine scaling factors; and optimize motion of the pointer using the scaling factors and relative coordinates received from an input device.

Figure 1:
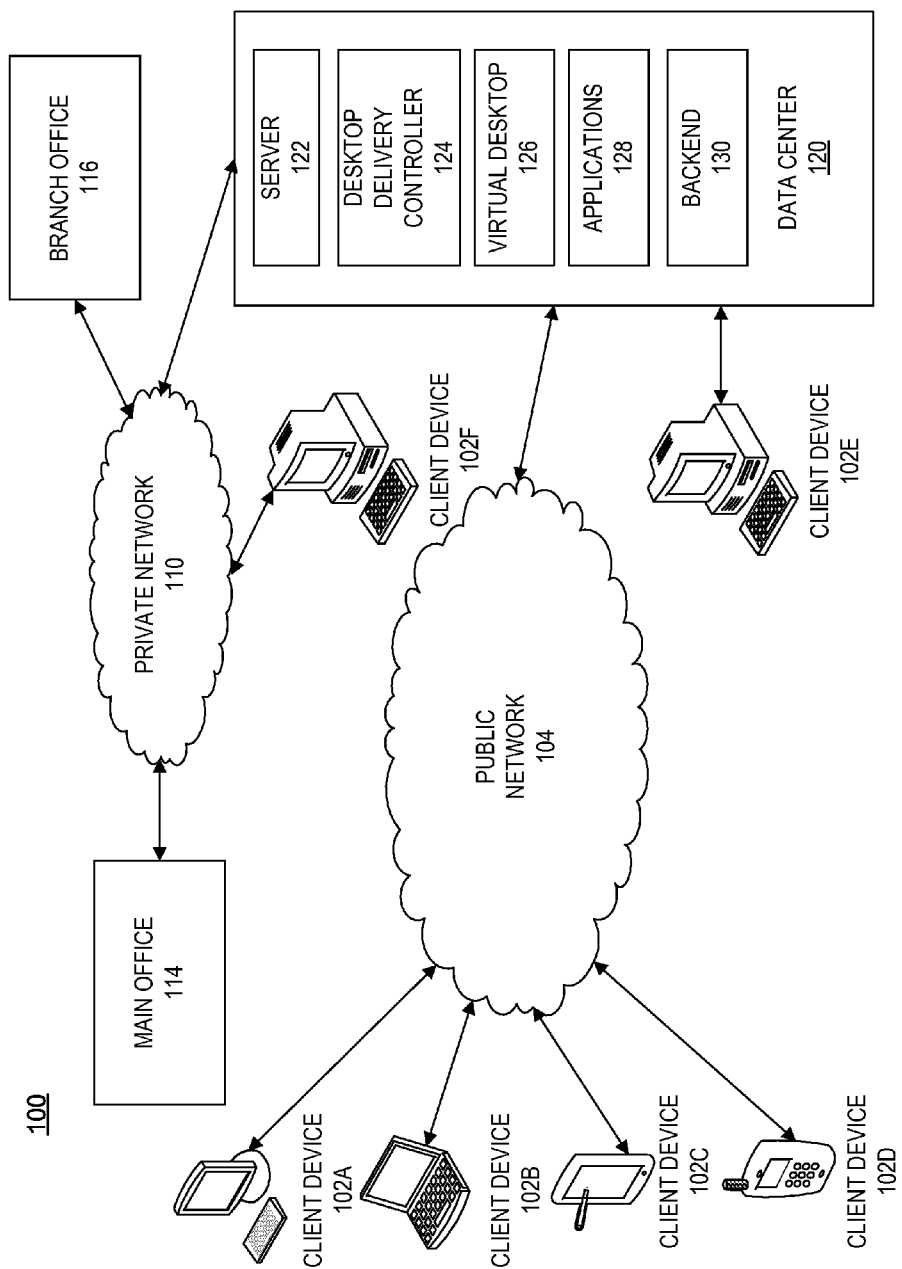
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102A-F, a public network 104, a private network 110, a main office 114, a branch office 116, and a data center 120.

One or more client devices 102A-F (collectively as 102) are devices that can acquire remote services from data center 120 through various means. Client devices 102A-F can communicate with data center 120 either directly (e.g., client device 102E) or indirectly through a public network 104 (e.g., client devices 102A-D) or a private network 110 (e.g., client device 102F). In some embodiment, a main office 114 and a branch office 116 can also include one or more client devices that are similar to client devices 102A-F. Main office 114 can be located, for example, in a principle place of business of a company. Branch office 116 can be located, for example, remote to main office 114. In some embodiments, the client devices of main office 114 and branch office 116 can also acquire remote services from data center 120 through, for example, private network 110.

When client device 102 communicates through public network 104 or private network 110, a communication link can be established. For example, a communication link can be established by public network 104, thereby providing a client device (e.g. client devices 102A-D) access to data center 120. A communication link can also be established by private network 110, thereby providing client device 102F, main office 114 and/or branch office 116 accesses to data center 120. While client devices 102A-D are portrayed as a computer (e.g., client devices 102A), a laptop (e.g., client device 102B), a tablet (e.g., client device 102C), and a mobile smart phone (e.g., client device 102D), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network, a wireless network, or a combination of both.

Data center 120 can be a central repository, either physical or virtual, for the storage, management, and dissemination of data and information pertaining to a particular public or private entity. Data center 120 can be used to house computer systems and associated components, such as one or more physical servers, virtual servers, and storage systems. Data center 120 can include, among other things, one or more servers (e.g., server 122), a desktop delivery controller 124, a virtual desktop 126, applications 128, and a backend system 130.

Server 122 can be an entity represented by an IP address and can exist as a single entity or a member of a server farm. Server 122 can be a physical server or a virtual server. In some embodiments, server 122 can include a hardware layer, an operating system, a communication subsystem, and a hypervisor creating or managing one or more virtual machines. Server 122 can provide one or more services to an endpoint. These services can include providing one or more applications 128 to one or more endpoints (e.g., client devices 102A-F). For example, one or more applications 128 can include Windows™- or SAP™-based applications and computing resources. Via the communication subsystem, server 122 can communicate with other devices (e.g., client devices 102) through various types of networks (e.g., private network 110 and public network 104).

Desktop delivery controller 124 can be a device that enables delivery of services, such as virtual desktops 126 to client devices (e.g., client devices 102A-F). Desktop delivery controller 124 can provide functionality required to manage, maintain, and optimize all virtual desktop communications. In some embodiments, desktop delivery controller 124 can control, manage, maintain, or optimize the provisioning of applications 128.

In some embodiments, one or more virtual desktops 126 can provide one or more applications 128. Virtual desktops 126 can include hosted shared desktops allowing multiple user to access a single shared remote-desktop-services desktop, virtual desktop infrastructure desktops allowing each user to have their own virtual machine, streaming disk images, a local virtual machine, individual applications (e.g., one or more applications 128), or a combination thereof.

Backend system 130 can be a single or multiple instances of computer networking hardware, appliances, or servers in a server farm or a bank of servers. Backend system 130 can interface directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Figure 2A:
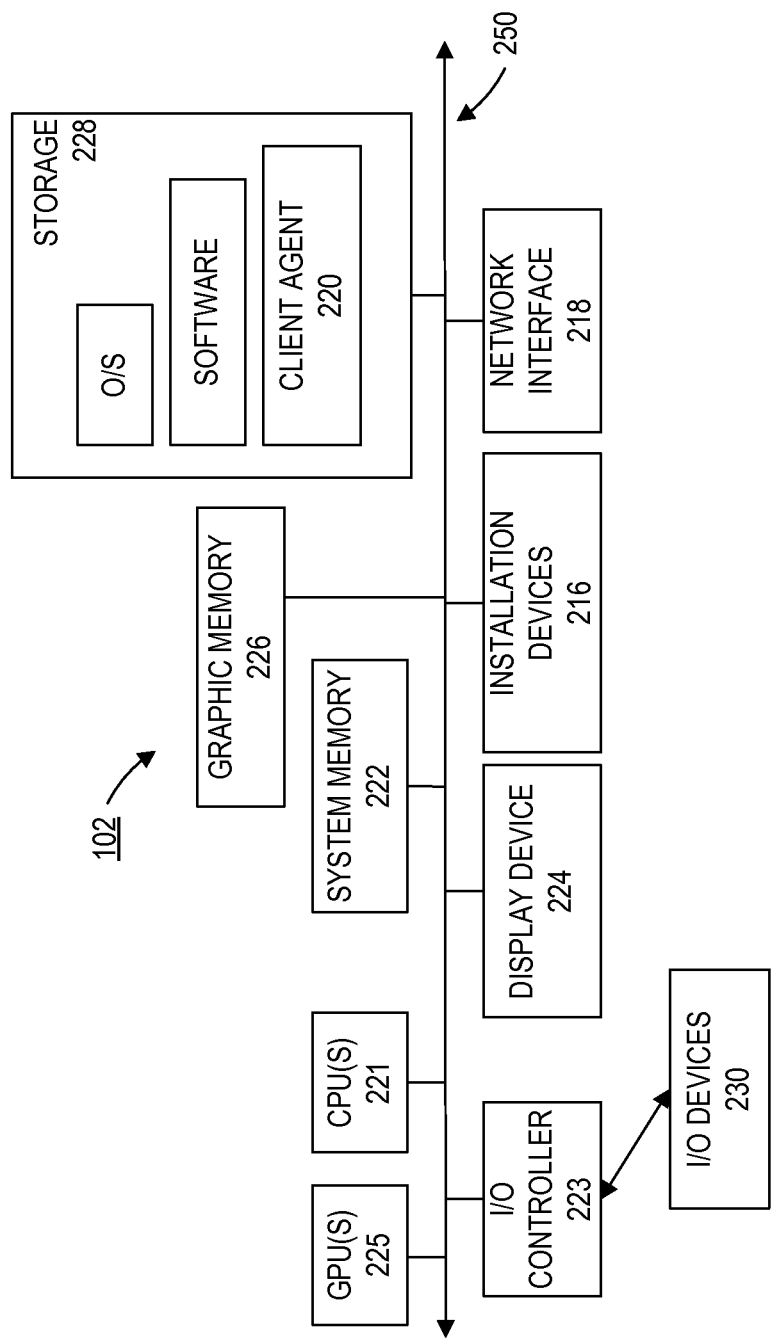
FIGS. 2A-2B are block diagrams of an exemplary computing device, consistent with embodiments of the present disclosure.
Figure 2B:
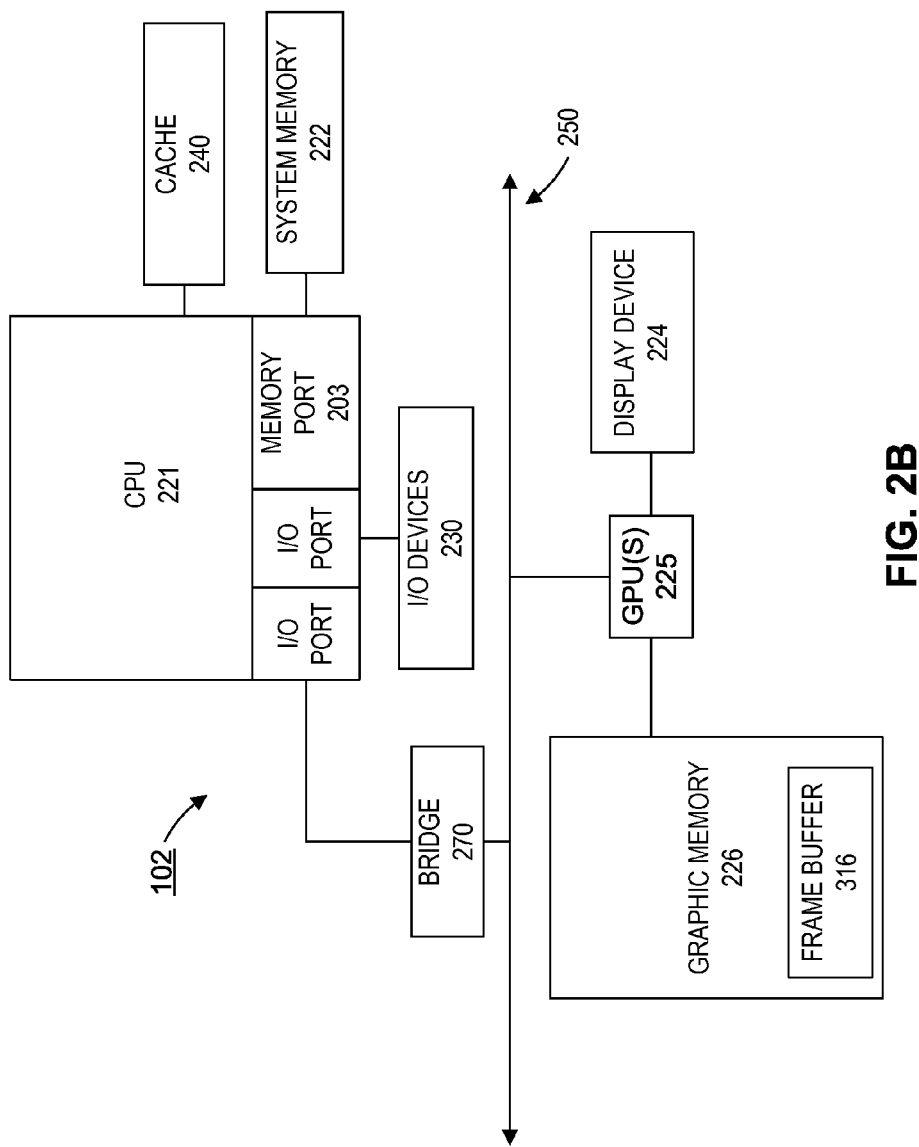

FIGS. 2A-2B are block diagrams of an exemplary client device 102, consistent with embodiments of the present disclosure. As shown in FIG. 2A, each client device 102 can include one or more central processing units (CPUs) 221, one or more graphics processing units (GPUs 225), a system memory 222, and a graphic memory 226. CPUs 221 can be any logic circuitry that responds to and processes instructions fetched from the system memory 222. CPUs 221 can be a single or multiple microprocessors, field-programmable gate arrays (FPGAs), or digital signal processors (DSPs) capable of executing particular sets of instructions stored in a memory (e.g., system memory 222) or a cache (e.g., cache 240). The memory can include a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. System memory 222 can be one or more memory chips capable of storing data and allowing any storage location to be directly accessed by CPUs 221. System memory 222 can be any type of random access memory (RAM), or any other available memory chip capable of operating as described herein. In the exemplary embodiment shown in FIG. 2A, CPUs 221 can communicate with system memory 222 via a system interface 250.

GPUs 225 can be any type of specialized circuitry that can manipulate and alter memory (e.g., graphic memory 226) to provide and/or accelerate the creation of images stored in a frame buffer (e.g., frame buffer 316 shown in FIG. 2B) for output to a display device (e.g., display device 224). GPUs 225 can have a highly parallel structure making them more effective than general-purpose CPUs 221 for algorithms where processing of large blocks of graphical data can be performed in parallel. Furthermore, the functionality of GPUs 225 can also be included in a chipset of in some other type of special purpose processing unit or co-processor.

CPUs 221 can connect to system memory 222 and system interface 250. CPUs 221 can execute programming instructions stored in the system memory 222, operates on data stored in system memory 222 and communicates with the GPUs 225 through the system interface 250, which bridges communication between the CPUs 221 and GPUs 225. In some embodiments, CPUs 221, GPUs 225, system interface 250, or any combination thereof, can be integrated into a single processing unit. GPUs 225 can be capable of executing particular sets of instructions stored in system memory 222 to manipulate graphical data store in system memory 225 or graphic memory 226. For example, GPUs 225 can receive instructions transmitted by the CPUs 221 and processes the instructions in order to render graphics data stored in the graphic memory 226. Graphic memory 226 can be any memory space accessible by GPUs 225, including local memory, system memory, on-chip memories, and hard disk. GPUs 225 can enable displaying of graphical data stored in graphic memory 226 on display device 224.

Client device 102 can also include display device 224 and an input/output (I/O) device 230 (e.g., a keyboard, a mouse, or a pointing device) connected through an I/O controller 223, both of which communicate via system interface 250. It is appreciated that CPUs 221 can also communicate with system memory 222 and other devices in manners other than through system interface 250, such as through serial communication manners or point-to-point communication manners. Similarly, GPUs 225 can also communicate with graphic memory 226 and other devices in manners other than system interface 250. Furthermore, I/O device 230 can also provide storage and/or an installation medium for the client device 102.

FIG. 2B depicts an embodiment of an exemplary client device 102 in which CPUs 221 communicates directly with system memory 222 via a memory port 203, and similarly GPUs 225 communicates directly with graphic memory 226. CPUs 221 can communicate with a cache 240 via a secondary bus, sometimes referred to as a backside bus. In some embodiments, CPUs 221 can communicate with cache 240 via system interface 250. Cache 240 typically has a faster response time than system memory 222. In some embodiments, such as the embodiment shown in FIG. 2B, CPUs 221 can communicate directly with I/O device 230 via an I/O port. In further embodiments, I/O device 230 can be a bridge 270 between system interface 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2B, GPUs 225 can also communicate directly with graphic memory 226 and display device 224. GPUs 225 can communicate with CPUs 221 and other devices through system interface 250. Graphic memory 226 can also include a frame buffer 316. Frame buffer 316 can be a graphic output device that drives a display device (e.g., display device 224) from a memory buffer of graphic memory 226 containing a complete frame of graphical data. Frame buffer 316 can store the final graphic frames, which are to be displayed on display device 224.

As shown in FIG. 2A, client device 102 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Client device 102 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, client device 102 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing client device 102 to any type of network capable of communication and performing the operations described herein.

Figure 3:
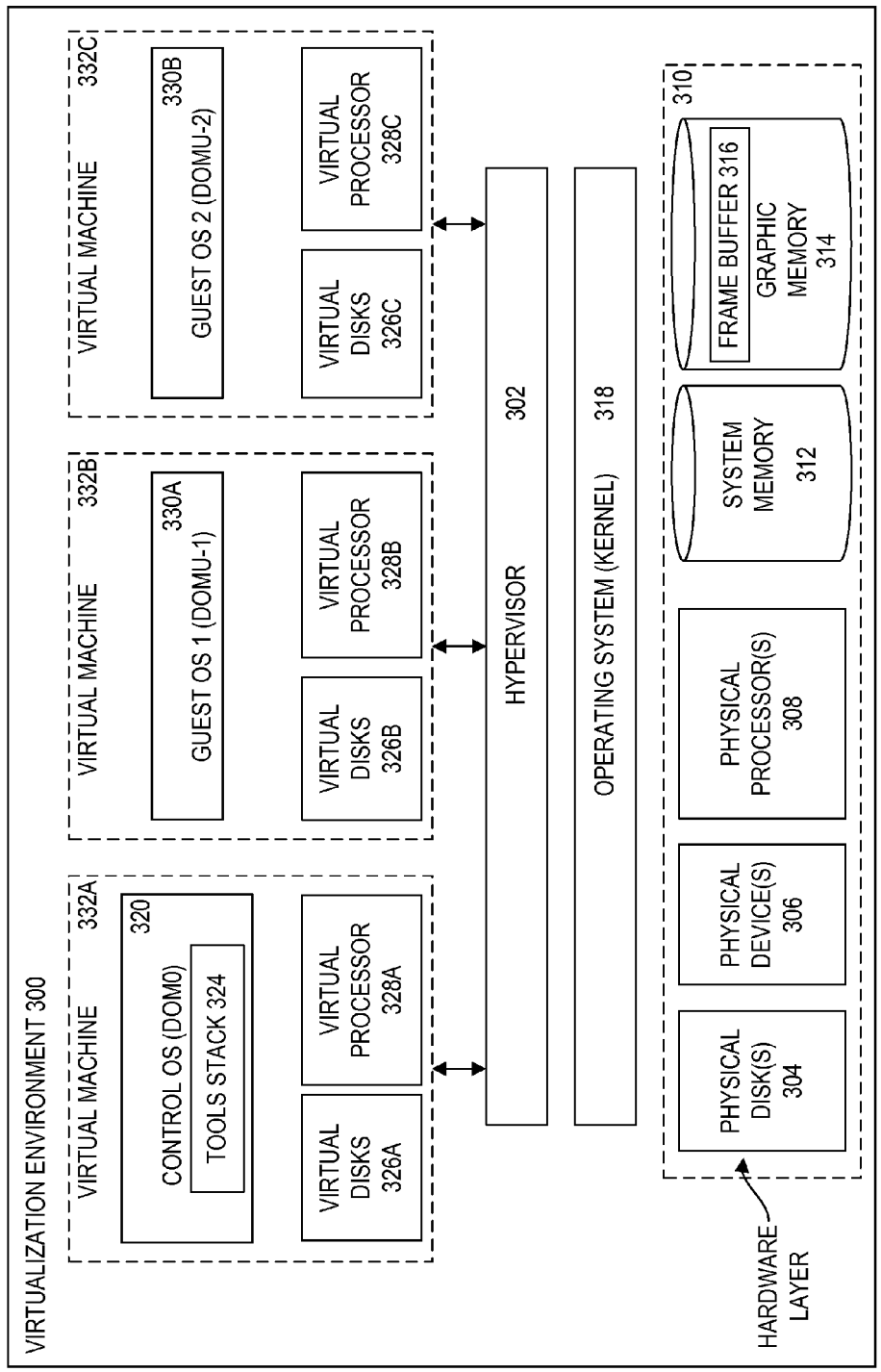
FIG. 3 is a block diagram of an exemplary virtualization environment, consistent with embodiments of the present disclosure.

FIG. 3 is a block diagram of an exemplary virtualization environment 300. In some embodiments, virtualization environment 300 can include a computing device (e.g., client device 102 or server 122). In some embodiments, the modules, programs, virtual machines, and commands stored and executed by virtualization environment 300 can be executed by more than one computing device. For example, virtualization environment 300 can include a server farm.

Virtualization environment 300 can include a hardware layer 310 that can include one or more physical disks 304, one or more physical devices 306, one or more physical processors 308, a system memory 312, and a graphic memory 314. In some embodiments, frame buffer 316 can be stored within a memory element in graphic memory 314 and can be executed by one or more of physical processors 308.

Physical disk 304 can be either an internal or an external hard disk. Virtualization environment 300 can communicate with an external hard disk that is included in the hardware layer 310 as a physical disk 304. Physical devices 306 can be any combination of devices included in virtualization environment 300 and external devices that communicate with virtualization environment 300. Physical device 306 can be any device such as a network interface card, a video card, a keyboard, a pointing device, an input device, a monitor, a display device, speakers, an optical drive, a storage device, a universal serial bus connection, any device connected to virtualization environment 300, any device communicating with virtualization environment 300, a printer, a scanner, or any other device that is desired. A pointing device can be, for example, a mouse, a stylus, a trackball, a joystick, a pointing stick, a human finger, or any other input interface that can allow a user to input spatial data to a computing device. In some embodiments, physical processors 308 can be any processor and can include, for example, CPUs and GPUs.

System memory 312 can include any type of memory that can store data, programs, firmwares, or set of executable instructions. Programs, firmwares, or executable instructions stored in system memory 312 can be executed by one or more physical processors 308 of virtualization environment 300. Graphic memory 314 can be any memory space accessible by the physical processors 308, including local memory, system memory, on-chip memories, and hard disk. Physical processors 308 can display certain graphics corresponding to graphical data stored in graphic memory 316 on a display device of physical devices 306.

Virtualization environment 300 can further include an operating system 318 that can be stored in a memory element in system memory 312 and executed by one or more of physical processors 308. Operating system 318 can also be referred to as kernel. Moreover, virtualization environment 300 can include a hypervisor 302. Hypervisor 302 can be a program executed by physical processors 308 in virtualization environment 300 to manage any number of virtual machines. Hypervisor 302 can be referred to as a virtual machine monitor, or platform virtualization software. In some embodiments, hypervisor 302 can be any combination of executable instructions and hardware that monitors virtual machines executing on a computing device. Hypervisor 302 can be stored in a memory element in system memory 312.

Hypervisor 302 can provide virtual resources to one or more virtual machines, e.g., virtual machines 332A-C. A virtual machine can be a fully-virtualized virtual machine. A fully-virtualized virtual machine can have a guest operating system to allow executing of its software. While running on a host computer, a fully-virtualized virtual machine is unaware that it is a virtual machine. A fully-virtualized virtual machine is sometimes also referred as a Domain U or domU virtual machine (e.g., virtual machine 332A). A domU virtual machine can be controlled by a control program of another virtual machine. The control program can also be referred to as a control operating system, a control domain, a Domain 0, or dom0. Thus, the virtual machine that runs the control operating system can be referred to as a dom0 virtual machine (e.g., virtual machines 332B-C). In some embodiments, a dom0 virtual machine can have direct access to host computer's hardware resources and thus the control program can be executed by the host computer's operating system. A dom0 virtual machine can have access to the host computer's hardware resources through a hypervisor that either runs directly on the host computer's hardware (i.e., a bare metal hypervisor) or runs within the host computer's operating system (i.e., a hosted hypervisor). In some embodiments, a virtual machine can also be a service domain virtual machine, also referred as a Domain S or domS virtual machine (not shown).

Hypervisor 302, in some embodiments, can provide virtual resources to guest operating systems (domU) 330A-B and/or control operating system (dom0) 320 in any manner such that hypervisor 302 simulates any desirable operating systems (e.g., Windows, Linux, Unix) to execute on virtual machines 332A-C. The system resources can include, for example, hardware layer 310 and any other component included in virtualization environment 300. In these embodiments, hypervisor 302 may be used to emulate virtual hardware, partition physical hardware, virtualize physical hardware, or execute virtual machines that provide access to computing environments. In some embodiments, hypervisor 302 can control processor scheduling and memory partitioning for virtual machine 332A-C executing in virtualization environment 300.

In some embodiments, hypervisor 302 can create virtual machines 332A-C, in which guest operating systems 330A-B or control operating system 320 execute, respectively. As an example, hypervisor 302 can load a virtual machine image to create a virtual machine 332. As another example, hypervisor 302 can execute guest operating systems 330A and 330B within virtual machines 332B and 332C, respectively. Guest operating systems 330A-B are further described in details below.

As shown in FIG. 3, hypervisor 302 of virtualization environment 300 can be a host hypervisor, or a hypervisor that executes within an operating system (kernel) 318 executing on virtualization environment 300. As a host hypervisor, hypervisor 302 can execute within operating system 318. And virtual machines 332A-C execute at a level above hypervisor 302. If hypervisor 302 is a host hypervisor, operating system 318 can be referred to as a host operating system, while the other operating systems (e.g., operating systems 330A-B) can be referred to as guest operating systems. Guest operating systems 330A-B can execute on virtual machines 332B-C (or domU virtual machines).

In some embodiments, hypervisor 302 of virtualization environment 300 can be a bare metal hypervisor, or a hypervisor that has direct access to all applications and processes executing in the host computing device (e.g., client device 102), all resources on the host computing device, and all hardware on the host computing device (e.g., the hardware layer shown in FIG. 3) or communicating with the host computing device. While a host hypervisor accesses system resources through a host operating system (e.g., operating system 318), a bare metal hypervisor can directly access all system resources. For example, if hypervisor 302 is a bare metal hypervisor, it can execute directly on one or more physical processors 308, and can include program data stored in the system memory 312 and graphic memory 314.

In a virtualization environment that employs a bare metal hypervisor configuration, the host operating system can be executed by one or more virtual machines 332. Thus, a user of the computing device can designate one or more virtual machines 332 as the dom0 virtual machine (e.g. virtual machine 332A). This dom0 virtual machine can imitate the host operating system by allowing a user to interact with the computing device in substantially the same manner that the user would interact with the computing device via host operating system 318.

Virtualization environment 300 can host or execute one or more virtual machines 332A-C. As described above, a virtual machine executing a control operating system can be referred to as a dom0 virtual machine; and a guest virtual machine can be referred as a domU virtual machine. A virtual machine 332 can be a set of executable instructions that, when executed by physical processors 308, imitate the operation of a physical computing device such that programs and processes can be executed on virtual machine 332 in a manner similar to that on a physical computing device. It is appreciated that virtualization environment 300 can host any number of virtual machines 332. In some embodiments, each virtual machine 332 can be provided, such as by hypervisor 302, with a unique virtual view of the physical hardware, memory, processor, and other system resources available to that virtual machine 332. The unique virtual view can be based on, for example, virtual machine permissions, application of a policy engine to one or more virtual machine identifiers, the user accessing a virtual machine, the applications executing on a virtual machine, networks accessed by a virtual machine, or any other desired criteria. In some embodiments, each virtual machine 332 can be provided with a substantially similar virtual view of the physical hardware, memory, processor, and other system resources available to the virtual machines 332.

As shown in FIG. 3, virtual machines 332A-C can include one or more virtual disks 326A-C (collectively as 326). Virtual disks 326 can correspond to, for example, one or more physical disks or a portion of a physical disk (e.g., physical disks 304). As an example, virtual disk 326A can be allocated a first portion of physical disks 304; virtual disk 326B can be allocated a second portion of physical disks 304; and virtual disk 326C can be allocated a third portion of physical disks 304. In some embodiments, one or more of virtual disks 326A-C can include disk partitions and a file system, similar to those of a physical disk. For example, virtual disk 326A can include a system disk, which includes disk partitions and system files associated with virtual machine 332A. In some embodiments, the system disk can be shared among virtual machines. For example, virtual machines 332B and 332C can have the same or similar system disk.

The file systems of virtual disks 326A-C can also include files and folders. For example, virtual disk 326A can also include a user disk, which can store user data such as user files and folders. The user data stored on a user disk is also referred to as persistent user data. In some embodiments, the system disk and/or the user disk of a virtual machine of a client device (e.g., client device 102) can be synchronized with the corresponding disks stored in a server (e.g., server 122). The synchronization of system disk and/or the user disk between the server and the client device can include, for example, updating the system disk to a newer version published by the server and providing backup of the user disk. In some embodiments, a virtual disk can also include a local disk. The local disk can store local data associated with a virtual machine (e.g., virtual machine 332B). The local disk can also include persistent user data. In some embodiments, the persistent user data stored on a local disk cannot be synchronized with a server.

In some embodiments, virtualization environment 300 can also include virtual apertures (not shown) in a virtual memory space, which can be a virtual view of the virtual memory available to virtual machines 332. The virtual apertures can correspond to for example, caches, buffers, physical memories such as system memory 312, and graphic memory 314, internal or external physical disks such as hard disk 304. As an example, under the circumstances that applications running on virtual machine 332A do not require memory more than that is available in system memory 312; the virtual apertures of virtual machine 332A can correspond to a portion of system memory 312. As another example, under the circumstances that applications executed by virtual machine 332B requires memory more than that is available in system memory 312, the virtual apertures of virtual machine 332B can correspond to one or more portions of system memory 312, graphic memory 314, or even one or more portions of physical disks 304. The virtual apertures can be generated, provided, and managed by hypervisor 302.

Virtual processors 328A-C (collectively as 328) can be a virtualized view of one or more physical processors 308 of virtualization environment 300. In some embodiments, the virtualized view of the physical processors 308 can be generated, provided, and managed by hypervisor 302. In some embodiments, virtual processor 328 can have substantially the same characteristics as those of physical processors 308. In some embodiments, virtual processors 328 can provide a modified view of the physical processors 308 such that at least some of the characteristics of virtual processor 328 are different from the characteristics of the corresponding physical processors 308.

In FIG. 3, control operating system 320 can execute at least one application for managing and configuring the guest operating systems (domUs 330, e.g. domU-1 330A and domU-2 330B) executing on the virtual machines 332. In some embodiments, control operating system 320 can be referred to as control domain 320, domain 0 320, or dom0 320. While FIG. 3 shows that control operating system 320 is included in virtual machine 332A, control operating system 320 can be executed within any control virtual machine or any dom0 virtual machine, can be executed by hypervisor 302, or can be executed by operating system 318 executing hypervisor 302. Control operating system 320 can execute an administrative application or program that can further display a user interface, which administrators can use to access the functionality of each virtual machine 332 and/or to manage each virtual machine 332. In some embodiments, the user interface generated by the administrative program can be used to terminate the execution of virtual machines 332, allocate resources to virtual machines 332, assign permissions to virtual machines 332, or manage security credentials associated with virtual machines 332.

Moreover, in some embodiments, control operating system 320 can start new virtual machines 332 or terminate execution of virtual machines 332. Control operating system 320 can also directly access hardware and/or resources within the hardware layer 310. In some embodiments, control operating system 320 can interface with programs and applications executing within the context of a virtual machine 332. Control operating system 320 can also interface with programs and applications executing on the computing device in virtualization environment 300 that are outside of the context of a virtual machine 332.

Furthermore, control operating system 320 can also interact with one or more guest operating systems 330. Control operating system 320 can communicate with guest operating systems 330 through hypervisor 302. As an example, guest operating systems 330 can communicate with control operating system 320 via a communication channel established by the hypervisor 302, such as via a plurality of shared memory pages made available by the hypervisor 302. In some embodiments, control operating system 320 can also include a network back-end driver (not shown) for communicating directly with networking hardware provided by virtualization environment 300. The network back-end driver can process at least one virtual machine request from at least one guest operating system 330. Control operating system 320 can also include a block back-end driver for communicating with a storage element included in virtualization environment 300, such as system memory 312 and graphic memory 314. In some embodiments, the block back-end driver can read and write data from the storage element based upon at least one request received from a guest operating system 330.

Control operating system 320 can also include a tools stack 324, which can provide functionality for interacting with the hypervisor 302. Tools stack 324 can include customized applications for providing improved management functionality to an administrator of a virtual machine farm. In some embodiments, at least one of tools stack 324 and control operating system 320 can include a management application programming interface (API) that provides an interface for remotely configuring and controlling virtual machines 332 running in virtualization environment 300.

As shown in FIG. 3, guest operating systems 330 can provide users of virtualization environment 300 with access to resources within a computing environment. Such resources can include programs, applications, files, executable instruction codes, desktop environments, computing environment, or other resources made available to users of virtualization environment 300. In some embodiments, the resource can be delivered to virtualization environment 300 via a plurality of access methods including conventional direct installations in virtualization environment 300 or delivery via a method for application streaming. The resource can also be delivered to virtualization environment 300 via access methods such as delivery of output data generated by an execution of the resource on another computing device and communicated to virtualization environment 300 via a presentation layer protocol, delivery of output data generated by execution from a removable storage device connected to virtualization environment 300, and delivery of output data generated by execution via a virtual machine executing in virtualization environment 300.

Figure 4:
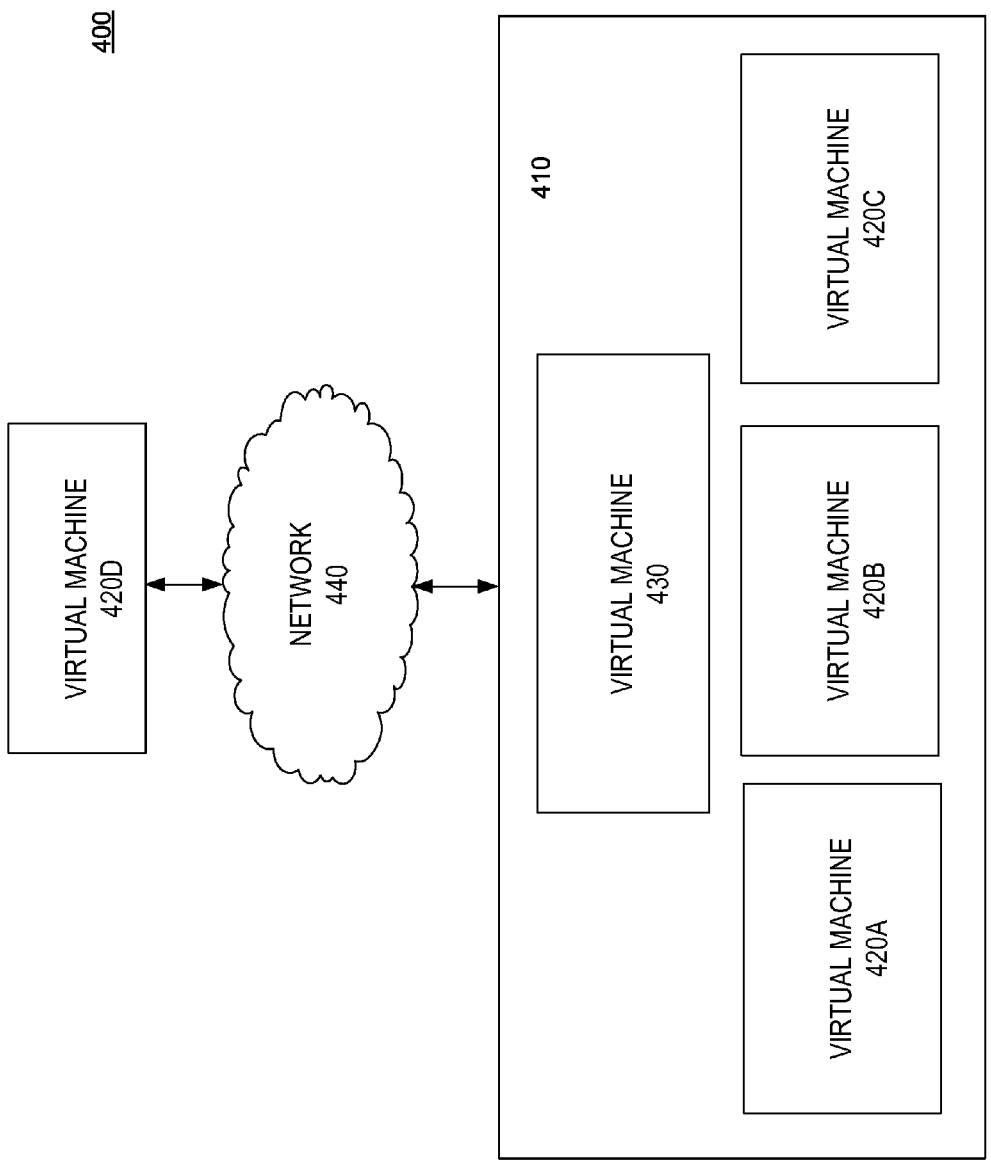
FIG. 4 is a block diagram of an exemplary system for optimizing motion of a pointer associated with a pointing device, consistent with embodiments of the present disclosure.

FIG. 4 is a block diagram of an exemplary system 400 for optimizing motion of a pointer associated with a pointing device. As shown in FIG. 4, system 400 can include a computing device 410. Computing device 410 can be, for example, client device 102 or server 122. Computing device 410 can include virtual machines 420A-C and a virtual machine 430. System 400 can also include a network 440 and a virtual machine 420D.

Virtual machines 420A-C can be executed by computing device 410 or reside on computing device 410. Virtual machine 420D can be executed by a different computing device (not shown), which can remotely communicate with virtual machine 430 via network 440. Network 440 can be any type of network, e.g., public network 104 or private network 110. In some embodiments, whether residing on the same computing device (e.g., computing device 410) or a different computing device, virtual machines 420A-D can be associated with a same pointing device. For example, a user can use a same pointing device (e.g., a mouse) to operate virtual machines 420A-D. In some embodiments, virtual machines 420A-D can also be associated with different pointing devices.

Further, in some embodiments, virtual machines 420A-D can be associated with a same display device (e.g., display device 224). For example, a display device can display desktops of virtual machines 420A-D on its screen. In some embodiments, virtual machines 420A-D can be associated with a plurality of display devices. For example, the desktop of each virtual machines 420A-D can be displayed on a separate display device. Moreover, one virtual machine can also be associated with a plurality of display devices. For example, the desktop of virtual machine 420A can be split, separated, extended, or otherwise displayed on two or more display devices. Virtual machines 420A-D can be domU virtual machines (e.g., virtual machines 332B and 332C) or guest virtual machines.

In some embodiments, one or more virtual machines 420A-D can record at least one attribute of the display device that the particular virtual machine is associated with and store the recorded one or more attributes. For example, virtual machines 420A-C can be associated with display devices that have aspect ratios of 4:3, 16:9, and 16:10, respectively. Virtual machines 420A-C can thus record the aspect ratios of their respective display devices and store the aspect ratios in virtual/physical apertures or virtual/physical disks (e.g., virtual disks 326B-C) of computing device 410. It is appreciated that attributes of the display device can also include aspect ratios, screen dimensions, screen resolutions, etc. For example, a display device can have one or more screen resolutions measured in pixels, such as 1920×1080, 1680×1050, 1280×720, 800×600, etc.

Virtual machines 420A-D can monitor and update the attributes of the display devices that the corresponding virtual machines are associated with. As an example, virtual machine 420A can be associated with a particular display device for a certain period of time and can become associated with another display device afterwards. Virtual machine 420A can detect the change of the display-device association, record the new display device attributes, and update the stored attributes accordingly. Virtual machines 420A-D can monitor, record, and update the attributes of the associated display devices periodically, continuously, or in any desired manner.

As shown in FIG. 4, in some embodiments, virtual machine 430 can be a dedicated virtual machine for optimizing the motion of a pointer associated with a pointing device (e.g., a back-end virtual machine). As described above, in some embodiments, a user can operate virtual machines 420A-D using a same pointing device. Virtual machine 430 can thus provide optimization of the motion of the pointer associated with the pointing device for operating virtual machines 420A-D. Virtual machine 430 can be a dom0 virtual machine (e.g., virtual machine 332A) or a control virtual machine. Virtual machine 430 can also be a domU or domS virtual machine that is dedicated for optimizing the motion of a pointer associated with a pointing device.

In some embodiments, as shown in FIG. 4, virtual machine 430 can reside in the same computing device 410 as virtual machines 420A-C. Under such circumstances, virtual machine 430 can communicate locally with virtual machines 420A-C, such as directly or via a hypervisor. Virtual machine 430 can reside in a computing device (e.g., computing device 410) different from the computing device where virtual machine 420D resides. Under such circumstances, virtual machine 430 can communicate remotely with virtual machine 420D via network 440.

Whether communicating locally or remotely, virtual machine 430 can obtain the recorded attributes, such as aspect ratios of the display devices associated with virtual machines 420A-D. Virtual machine 430 can monitor the virtual/physical apertures and/or virtual/physical disks of computing device 410 to determine whether one or more virtual machines 420A-D recorded attributes of their associated display devices. If virtual machine 430 determines that one or more of virtual machines 420A-D did not record such attributes, virtual machine 430 can use preconfigured (e.g., a default) attributes for optimizing the motion of the pointer. Otherwise, virtual machine 430 can obtain the recorded attributes for optimization. Moreover, in some embodiments, virtual machine 430 can monitor and determine whether one or more virtual machines 420A-D updated the recorded attributes. As described above, virtual machines 420A-D can update the recorded attributes if, for example, the attributes of the associated display devices change. If virtual machine 430 determines that one or more virtual machines 420A-D updated the recorded attributes, it can obtain the updated attributes for optimization.

Figure 5:
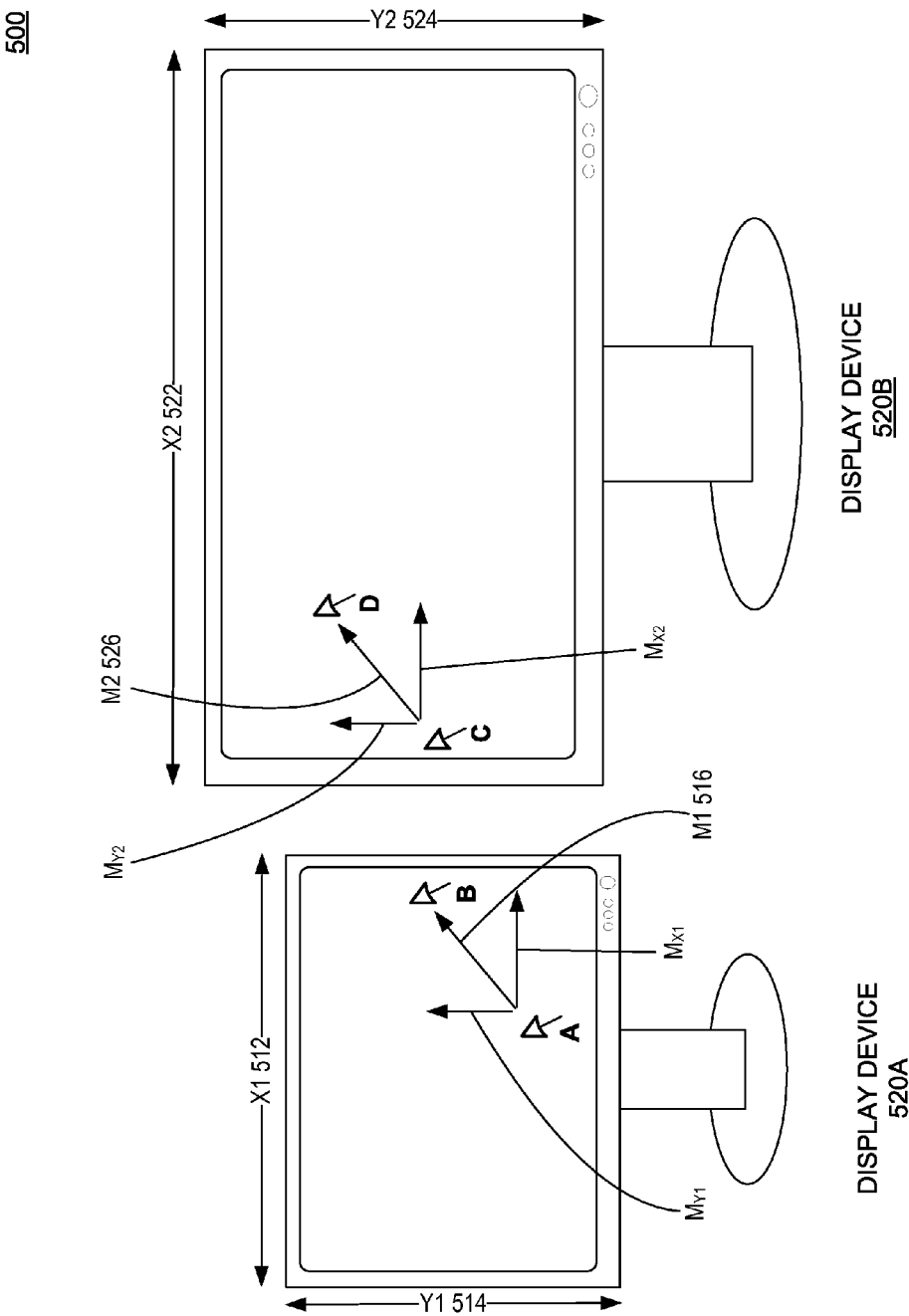
FIG. 5 is a block diagram illustrating scaling of relative coordinates corresponding to different display devices, consistent with embodiments of the present disclosure.

In some embodiments, based on the obtained attributes, virtual machine 430 can determine at least one of a first scaling factor and a second scaling factor for optimization. FIG. 5 is a block diagram 500 illustrating scaling of relative coordinates corresponding to display devices that have different attributes. With reference to FIGS. 4 and 5, virtual machine 430 can obtain the aspect ratio of a display device (e.g., display device 520A) associated with virtual machine 420A and the aspect ratio of another display device (e.g., display device 520B) associated with virtual machine 420B. The aspect ratio of display device 520A can be represented as X1 512:Y1 514; and the aspect ratio of display device 520B can be represented as X2 522:Y2 524. As an example, the aspect ratio of display device 520A can be 1:1, and the aspect ratio of display device 520B can be 16:9. It is appreciated that display devices 520A and 520B can have any aspect ratios.

After obtaining the one or more attributes of the display devices, virtual machine 430 can determine at least one of the first scaling factor and the second scaling factor. For example, as shown in FIG. 5, with respect to display device 520A, virtual machine 430 can determine that the first scaling factor can be a constant (e.g., 1 or a predetermined scaling factor that can be adjusted); and the second scaling factor can be the first scaling factor (e.g., the constant) multiplied by the ratio of the screen resolutions or aspect ratio of display device 520A or 520B (e.g., X1 512 divided by Y1 514, or X2 522 divided by Y2 524). As an example, if aspect ratio of display device 520A is 1:1, virtual machine 430 can determine that the first and second scaling factors both equal to the constant (e.g., 1). With respect to display device 520B, virtual machine 430 can determine that the first scaling factor equals the constant; and the second scaling factor equals the constant*X2 522/Y2 524. As an example, if the aspect ratio of display device 520B is 16:9, virtual machine 430 can determine that the first scaling factor is a constant (e.g., 1) and the second scaling factor is the constant multiplied by about 1.78 (i.e., 16/9). As another example, if the screen resolution of display device 520B is 800×600, virtual machine 430 can determine that the first scaling factor is a constant (e.g., 1) and the second scaling factor is the constant multiplied by about 1.33 (i.e., 800/600).

In some embodiments, the first scaling factor can be a constant divided by a first attribute (e.g., the x-screen resolution) of the display device; and the second scaling factor can be a constant divided by a second attribute (e.g., the y-screen resolution) of the display device. For example, with respect to display device 520B, the first scaling factor can be a constant (e.g., 1 or a predetermined scaling factor that can be adjusted) divided by X2 522; and the second scaling factor can be the constant divided by Y2 524. In some embodiments, the first scaling factor can be a constant (e.g., 1 or a predetermined scaling factor that can be adjusted) multiplied by the inverse ratio of the screen resolutions or aspect ratio of display device 520A or 520B (e.g., Y1 514 divided by X1 512, or Y2 524 divided by X2 522); and the second scaling factor can be the constant. In some embodiments, one of the first and second factors, but not both, can be required.

With reference to FIGS. 4 and 5, virtual machine 430 can optimize the motion of the pointer associated with a pointing device based on at least one of the first scaling factor and the second scaling factor. The motion of the pointer may include the pointer's velocity, speed, positive or negative acceleration, etc. As described above, virtual machine 430 can be a dedicated virtual machine for synchronizing the pointer associated with the pointing device. Virtual machine 430 can receive one or more relative coordinates corresponding to the relative movements of the pointer. The relative coordinates can be provided by an input device. As an example, with respect to a movement of the pointer on display device 520A that is associated with virtual machine 420A, virtual machine 430 can receive a relative coordinate M1 516 corresponding to the movement of the pointer from a point A to a point B. Relative coordinate M1 516 can have an x-axis component Mx1 and a y-axis component My1. As another example, with respect to movement of pointer on display device 520B that is associated with virtual machine 420B, virtual machine 430 can receive a relative coordinate M2 526 corresponding to movement of the pointer from point C to point D. Relative coordinate M2 526 can have an x-axis component Mx2 and a y-axis component My2.

Virtual machine 430 can scale the received relative coordinates based on at least one of the first scaling factor and the second scaling factor. As an example, with respect to relative coordinate M1 516 shown on display device 520A, virtual machine 430 can scale the x-axis component Mx1 of relative coordinate M1 516 by multiplying the first scaling factor associated with display device 520A with x-axis component Mx1, and/or scale the y-axis component My1 by multiplying the second scaling factor associated with display device 520A with y-axis component My1. As described above, with respect to display device 520A, the first scaling factor can be a constant or a constant/X1 512; and the second scaling factor can be the constant multiplied by X1 512/Y1 514 or the constant/Y1 514, respectively. As an example, if the aspect ratio of display device 520A is 1:1, first and second scaling factor are both 1 and Mx1 and My1 of relative coordinate M1 516 are thus not scaled (or scaled by multiplying 1). In some embodiments, if the first and/or second scaling factor equals 1, virtual machine 430 can determine that velocities of the pointer are optimized.

As another example, with respect to relative coordinate M2 526 shown on display device 520B, virtual machine 430 can scale the x-axis component Mx2 of relative coordinate M2 526 by multiplying the first scaling factor associated with display device 520B with Mx2, and/or scale the y-axis component My2 by multiplying the second scaling factor associated with display device 520B with My2. As described above, with respect to display device 520B, the first scaling factor can be a constant or a constant/X2 522; and the second scaling factor can be the constant multiplied by X2 522/Y2 524 or the constant/Y2 524, respectively. As an example, if the screen resolution of display device 520B is 800×600, the first scaling factor can be a constant or a constant divided by about 800 (i.e., the x resolution) and the second scaling factor can be the constant*1.33 (i.e., 800/600) or the constant/600. Therefore, virtual machine 430 can scale the x-axis component Mx2 of relative coordinate M2 526 by multiplying 1 with Mx2, and/or scale the y-axis component My2 by multiplying 1.33 with My2. It is appreciated that virtual machine 430 can scale one or both x-axis and y-axis components of the relative coordinates. It is further appreciated that the relative coordinates can be Cartesian coordinates, polar coordinates, or any other desired type of coordinates. For example, if the relative coordinates are polar coordinates, virtual machine 430 can scale the radial components and/or the angular components of the polar coordinates.

In some embodiment, virtual machine 430 can store the first and second scaling factors in virtual/physical apertures or virtual/physical disks of computing device 410, so that virtual machine 430 does not repeatedly calculate the scaling factors. Virtual machine 430 can also update one or both of the first and second scaling factors corresponding to the updated display-device attributes that are recorded by the corresponding target virtual machines.

Virtual machine 430 can convert the scaled relative coordinates to absolute coordinates before it provides the absolute coordinates to the target virtual machines, e.g., virtual machines 420A and 420B. As described above, as an example, display device 520A associated with virtual machine 420A can have an aspect ratio of 1:1; and display device 520B associated with virtual machine 420B can have an aspect ratio of 16:9. The input pointer area can have the same or different aspect ratio as the aspect ratios of display devices 520A and 520B. For example, if the input pointer area has an aspect ratio of 1:1, it has the same aspect ratio as that of display device 520A, but a different aspect ratio from that of display device 520B. In such a case, when pointers are present on display device 520A, virtual machine 420A may not need to scale the input pointer area. But when pointers are present on display device 520B, virtual machine 420B can scale the input pointer area to match the aspect ratio of display device 520B (e.g., scale the input pointer area to have an aspect ratio of 16:9).

As described above, scaling of the input pointer area alone to match the aspect ratio of a display device (e.g., display device 520B) can result in different velocities of the pointer along the x-axis and the y-axis, and therefore cause distortion of the motion of the pointer. In some embodiments, with the scaling of relative coordinates, the distortion caused by the scaling of the input pointer area can be mitigated, reduced, or eliminated. For example, virtual machine 430 can optimize the velocities of the pointer along the x-axis and the y-axis. As described above, with respect to display device 520B, virtual machine 430 can scale the x-axis component Mx2 of relative coordinate M2 526 by multiplying Mx2 with a first scaling factor (e.g., a constant or a constant/x-screen resolution), and scale the y-axis component My2 of relative coordinate M2 526 by multiplying My2 with a second scaling factor (e.g., the constant*x-screen resolution/y-screen resolution or the constantly-screen resolution). Such scaling of the relative coordinates can mitigate or reduce the distortion caused by scaling of the input pointer area. For example, distortion caused by scaling of the input pointer area to match the screen resolution of 800×600 can be mitigated or compensated by scaling of the x-axis component Mx2 of relative coordinate M2 526 by 1 (i.e., no scaling) and scaling of the y-axis component My2 of relative coordinate M2 526 by 1.33 (or 800/600). Therefore, by scaling of the relative coordinates according to the attributes of the display devices, virtual machine 430 can effectively optimize the velocities of the pointer along the x-axis and the y-axis.

In some embodiments, based on one or both of the scaled input pointer area and the scaled relative coordinates, virtual machine 430 can convert the scaled relative coordinates to absolute coordinates while optimizing the velocities of the pointer. For example, virtual machine 430 can convert the scaled relative movement of the pointer to absolute movements of the pointer with respect to a reference point, such as an origin point defined in an absolute coordination system.

In some embodiments, such as by scaling the coordinates before or during converting the relative coordinates to absolute coordinates, the minimum and maximum of the absolute coordinates of the input pointer area can remain unchanged, while velocities of the pointer can be optimized.

Figure 6:
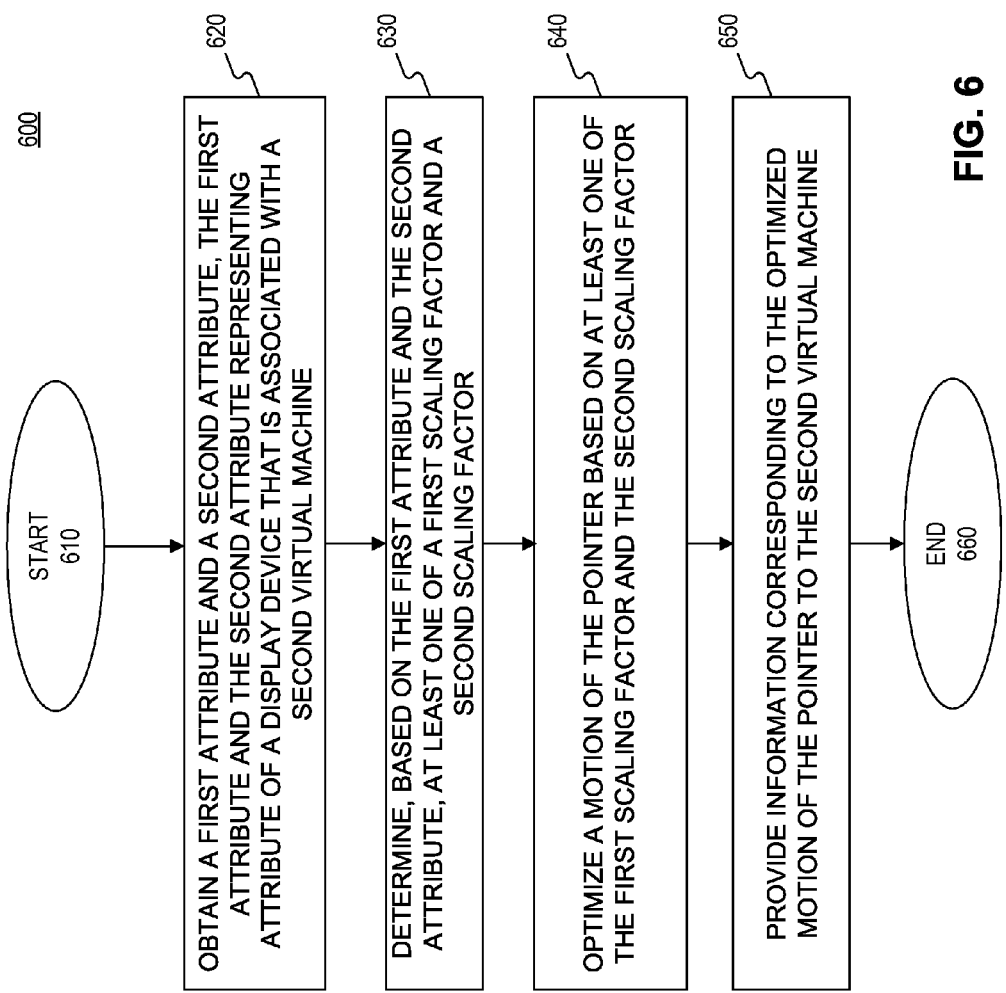
FIG. 6 is a flowchart of an exemplary method for optimizing motion of a pointer associated with a pointing device, consistent with embodiments of the present disclosure.

FIG. 6 is a flowchart of an exemplary method 600 for optimizing motion of a pointer associated with a pointing device. It will be readily appreciated that the illustrated procedure can be altered to delete steps or further include additional steps. After initial step 610, a first virtual machine (e.g., virtual machine 430) executed by a first computing device (e.g., computing device 410) can obtain (step 620) at least one of a first attribute and a second attribute. The first attribute and the second attribute represent attributes of a display device that is associated with a second virtual machine (e.g., virtual machine 420A).

The first and second virtual machines can be executed by the first computing device or reside on the first computing device. The second virtual machine can also be executed by a second computing device, which can remotely communicate with the first virtual machine via a network. The network can be any type of network, e.g., a public network or a private network. Further, the second virtual machine can be a domU virtual machine (e.g., virtual machines 332B and 332C) or a guest virtual machine.

In some embodiments, the second virtual machine can record at least one attribute of the display device that the second virtual machine is associated with and store the recorded one or more attributes. For example, the second virtual machine can be associated with a display device that has an aspect ratio of 16:9. The second virtual machine can thus record the aspect ratio of the associated display device and store the aspect ratio in the virtual/physical apertures and/or virtual/physical disks (e.g., virtual disks 326B-C) of a computing device. It is appreciated that attributes of the display device can also include any aspects of the display device, such as the screen resolutions. A display device can have one or more screen resolutions measured in pixels, such as 1920×1080, 1680×1050, 1280×720, 800×600, etc.

The second virtual machine, in some embodiments, can monitor and update the attributes of the display device that the second virtual machine is associated with. As an example, the second virtual machine can be associated with a particular display device for a certain period of time and can become associated with another display device afterwards. The second virtual machine can detect the change of the display-device association, record the new display device attributes, and update the stored attributes accordingly. The second virtual machine can monitor, record, and update the attributes of the associated display device periodically, continuously, or in any desired manner.

The first virtual machine can be a dedicated virtual machine for optimizing the motion of a pointer associated with a pointing device. As described above, in some embodiments, a user can operate the second virtual machine using a pointing device. The first virtual machine can thus provide optimization of the motion of the pointer associated with the pointing device for operating the second virtual machine. The first virtual machine can be a dom0 virtual machine (e.g., virtual machine 332A) or a control virtual machine. The first virtual machine can also be a domU or domS virtual machine that is dedicated for optimizing the motion of a pointer associated with a pointing device.

The first virtual machine can reside in the same first computing device as the second virtual machine. Under such circumstances, the first virtual machine can communicate locally with the second virtual machine, such as directly or via a hypervisor. In some embodiments, the first virtual machine can reside in the second computing device that is different from the first computing device that the second virtual machine resides. Under such circumstances, the first virtual machine can communicate remotely with the second virtual machine via the network.

Whether communicating locally or remotely, the first virtual machine can obtain the recorded attributes, such as an aspect ratio of the display device, from the second virtual machine. In some embodiments, the first virtual machine can monitor the virtual/physical apertures and/or virtual/physical disks of the first computing device and/or second computing device to determine whether the second virtual machine recorded attributes of its associated display devices. If the first virtual machine determines that the second virtual machine did not record such attributes, the first virtual machine can use a preconfigured (e.g., a default) attribute for optimization of the motion of the pointer. Otherwise, the first virtual machine can obtain the recorded attributes for optimization. Moreover, in some embodiments, the first virtual machine can monitor and determine whether the second virtual machine updated the recorded attributes. As described above, the second virtual machines can update the recorded attributes if, for example, the associated display device changes. If the first virtual machine determines that the second virtual machine updated the recorded attributes, it can obtain the updated attributes for optimization.

As shown in FIG. 6, after obtaining at least one of a first attribute and a second attribute, the first virtual machine can determine (step 630), based on the first attribute and the second attribute, at least one of a first scaling factor and a second scaling factor. For example, with respect to a display device associated with the second virtual machine, the first virtual machine can determine that the first scaling factor can be can be a constant (e.g., 1 or a predetermined scaling factor that can be adjusted); and the second scaling factor can be the first scaling factor (e.g., the constant) multiplied by the ratio of the first attribute and the second attribute. As an example, if the screen resolution of the display device associated with the second virtual machine is 800×600, the first virtual machine can determine that the first scaling factor is 1 (i.e., a constant) and determine that the second scaling factor is about 1.33 (i.e., 800/600).

In some embodiments, the first virtual machine can determine that the first scaling factor can be a constant divided by a first attribute (e.g., the x-screen resolution) of the display device; and the second scaling factor can be a constant divided by a second attribute (e.g., the y-screen resolution) of the display device. In some embodiments, the first scaling factor can be a constant (e.g., 1 or a predetermined scaling factor that can be adjusted) multiplied by the inverse ratio of the first attribute and the second attribute; and the second scaling factor can be the constant.

As shown in FIG. 6, after determining at least one of the first scaling factor and second scaling factor, the first virtual machine can optimize (step 640) the motion of the pointer based on at least one of the first scaling factor and the second scaling factor. As described above, the first virtual machine can be a dedicated virtual machine for synchronizing the pointer generated by a pointing device. The first virtual machine can receive one or more relative coordinates corresponding to the relative movements of the pointer. The relative coordinates can be provided by an input device. As an example, with respect to a movement of pointer on the display device associated with the second virtual machine, the first virtual machine can receive a relative coordinate corresponding to a movement of the pointer from a first point to a second point. The relative coordinate can have an x-axis component and a y-axis component.

The first virtual machine can scale the received relative coordinates based on at least one of the first scaling factor and the second scaling factor. As an example, the first virtual machine can scale the x-axis component of the relative coordinate by multiplying the first scaling factor with the x-axis component, and/or scale the y-axis component by multiplying the second scaling factor with the y-axis component. As described above, if the aspect ratio of the display device is 16:9, the first scaling factor is 1 (i.e., a constant) and the second scaling factor is about 1.78 (i.e., 16/9). Therefore, the first virtual machine can scale the x-axis component of the relative coordinate by multiplying 1 with the x-axis component (i.e., not scaling), and/or scale the y-axis component by multiplying 1.78 with the y-axis component. It is appreciated that the first virtual machine can scale one or both x-axis and y-axis components of the relative coordinates. It is further appreciated that the relative coordinates can be Cartesian coordinates, polar coordinates, or any other desired coordinates. For example, if the relative coordinates are polar coordinates, the first virtual machine can scale the radial components and/or the angular components of the polar coordinates.

In some embodiment, the first virtual machine can store the first and second scaling factors in a virtual/physical aperture or a virtual/physical disk of the first computing device, so that the first virtual machine does not repeatedly calculate the scaling factors. The first virtual machine can also update one or both of the first and second scaling factors corresponding to the updated display-device attributes that are recorded by the second virtual machine.

As shown in FIG. 6, after optimizing the motion of the pointer, the first virtual machine can provide (step 650) information corresponding to the optimized motion of the pointer to the second virtual machine. The information can be, for example, the absolute coordinates. In some embodiments, the first virtual machine can convert the scaled relative coordinates to absolute coordinates before it provides the absolute coordinates to the second virtual machine.

As described above, scaling of the input pointer area alone to match the aspect ratio of a display device can result in different velocities of the pointer along the x-axis and the y-axis, and therefore can cause distortion of the motion of the pointer. In some embodiments, with the scaling of relative coordinates, the distortion caused by the scaling of the input pointer area can be mitigated, reduced, or eliminated. For example, first virtual machine can optimize the velocities of the pointer along the x-axis and the y-axis. For example, as described above, for a display device that has an aspect ratio of 16:9, the first virtual machine can scale the x-axis component of the relative coordinate by multiplying 1 (or any other constant) with the x-axis component, and scale the y-axis component by multiplying 1.78 (or any other constant*1.78) with the y-axis component. Such scaling of the relative coordinates can mitigate or reduce the distortion caused by scaling of the input pointer area. For example, distortion caused by scaling of the input pointer area to match the aspect ratio of 16/9 can be mitigated or compensated by scaling of the x-axis component Mx2 of relative coordinate M2 526 by 1 and/or scaling of the y-axis component My2 of relative coordinate M2 526 by 1.78 (or 16/9). Therefore, by scaling of the relative coordinates according to the attributes of the display devices, the first virtual machine can effectively optimize the velocities of the pointer along the x-axis and the y-axis.

Based on the scaled relative coordinates, the first virtual machine can convert the scaled relative coordinates to absolute coordinates while optimizing the velocities of the pointer. For example, the first virtual machine can convert the scaled relative movement of the pointer to absolute movements of the pointer with respect to a reference point, such as an origin point defined in an absolute coordination system.

In some embodiments, such as by scaling the coordinates before or during converting the relative coordinates to absolute coordinates, the minimum and maximum of the absolute coordinates of the input pointer area can remain unchanged, while velocities of the pointer can be optimized.

After step 650, method 600 can proceed to an end 660. Method 600 can also be repeated any desired number of times for optimizing motion of the pointer associated with the pointing device.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A first computing device for optimizing motion of a pointer associated with a pointing device, the first computing device comprising:
   one or more processors configured to provide a hypervisor providing a first virtual machine, the first virtual machine being configured to:
   determine whether at least one of a first attribute and a second attribute representing attributes of a display device that are associated with a second virtual machine were recorded by the second virtual machine;
   responsive to the determination, obtain at least one of the first attribute and the second attribute, or at least one of a default first attribute and default second attribute
   determine, based on at least one of the first attribute, the second attribute, the default first attribute, and the default second attribute, at least one of a first scaling factor and a second scaling factor,
   optimize a motion of the pointer based on at least one of the first scaling factor and the second scaling factor, and
   provide information corresponding to the optimized motion of the pointer to the second virtual machine; and
   a storage configured to store the first attribute, the second attribute, and the information corresponding to the optimized motion of the pointer.

2. The first computing device of claim 1, wherein the first virtual machine is a control virtual machine; and wherein the second virtual machine is a guest virtual machine executed by the first computing device or a second computing device.

3. The first computing device of claim 1, wherein the first attribute corresponds to a horizontal screen dimension or a horizontal screen resolution and the second attribute corresponds to a vertical screen dimension or a vertical screen resolution.

4. The first computing device of claim 1, wherein the determination of at least one of the first scaling factor and the second scaling factor further comprises the first virtual machine to:
   divide a constant by the first attribute to obtain the first scaling factor and divide the constant by the second attribute to obtain the second scaling factor; or
   multiply the constant with the division of the first attribute by the second attribute to obtain the second scaling factor, the constant being the first scaling factor; or
   multiply the constant with the division of the second attribute by the first attribute to obtain the first scaling factor, the constant being the second scaling factor.

5. The first computing device of claim 1, wherein the optimization of the motion of the pointer further comprises the first virtual machine to:
   scale, based on at least one of the first scaling factor and the second scaling factor, a plurality of relative coordinates associated with the pointer, the pointer representing position information generated by the pointing device that is associated with the second virtual machine.

6. The first computing device of claim 5, wherein the plurality of relative coordinates are Cartesian coordinates or polar coordinates.

7. The first computing device of claim 5, wherein the scaling of the plurality of relative coordinates further comprises the first virtual machine to perform at least one of:
   multiply the first scaling factor with corresponding horizontal components of the plurality of relative coordinates; and
   multiply the second scaling factor with corresponding vertical components of the plurality of relative coordinates.

8. The first computing device of claim 5, wherein the optimization of the motion of the pointer further comprises the first virtual machine to:
   generate a plurality of absolute coordinates based on the plurality of relative coordinates, the absolute coordinates representing absolute movements of the pointer with respect to a reference point.

9. The first computing device of claim 1, wherein the optimization of the motion of the pointer further comprises the first virtual machine to:
   generate a plurality of absolute coordinates based on a plurality of relative coordinates associated with the pointer, the pointer representing position information generated by the pointing device that is associated with the second virtual machine.

10. The first computing device of claim 1, wherein the second virtual machine records and updates the first attribute and the second attribute representing attributes of a display device that is associated with the second virtual machine.

11. A method for optimizing motion of a pointer associated with a pointing device, the method being performed by a first computing device that includes one or more processors configured to provide a hypervisor providing a first virtual machine, the method comprising:
   determining whether at least one of a first attribute and a second attribute representing attributes of a display device that are associated with a second virtual machine were recorded by the second virtual machine;
   responsive to the determination, obtaining at least one of the first attribute and the second attribute, or at least one of a default first attribute and default second attribute;
   determining, based on at least one of the first attribute, the second attribute, the default first attribute, and the default second attribute, at least one of a first scaling factor and a second scaling factor,
   based on at least one of the first attribute and the second attribute, at least one of a first scaling factor and a second scaling factor;
   optimizing a motion of the pointer based on at least one of the first scaling factor and the second scaling factor; and
   providing information corresponding to the optimized motion of the pointer to the second virtual machine.

12. The method of claim 11, wherein the first virtual machine is a control virtual machine; and wherein the second virtual machine is a guest virtual machine executed by the first computing device or a second computing device.

13. The method of claim 11, wherein the first attribute corresponds to a horizontal screen dimension or a horizontal screen resolution and the second attribute corresponds to a vertical screen dimension or a vertical screen resolution.

14. The method of claim 11, wherein determining at least one of the first scaling factor and the second scaling factor further comprises:
   dividing a constant by the first attribute to obtain the first scaling factor and dividing the constant by the second attribute to obtain the second scaling factor; or
   multiplying the constant with the division of the first attribute by the second attribute to obtain the second scaling factor, the constant being the first scaling factor; or
   multiplying the constant with the division of the second attribute by the first attribute to obtain the first scaling factor, the constant being the second scaling factor.

15. The method of claim 11, wherein optimizing the motion of the pointer further comprises:
   scaling, based on at least one of the first scaling factor and the second scaling factor, a plurality of relative coordinates associated with the pointer, the pointer representing position information generated by the pointing device that is associated with the second virtual machine.

16. The method of claim 15, wherein the plurality of relative coordinates are Cartesian coordinates or polar coordinates.

17. The method of claim 15, wherein scaling the plurality of relative coordinates further comprises at least one of:
   multiplying the first scaling factor with corresponding horizontal components of the plurality of relative coordinates; and
   multiplying the second scaling factor with corresponding vertical components of the plurality of relative coordinates.

18. The method of claim 15, wherein optimizing the motion of the pointer further comprises:
   generating a plurality of absolute coordinates based on the plurality of relative coordinates, the absolute coordinates representing absolute movements of the pointer with respect to a reference point.

19. The method of claim 11, wherein optimizing the motion of the pointer further comprises:
   generating a plurality of absolute coordinates based on a plurality of relative coordinates associated with the pointer, the pointer representing position information generated by the pointing device that is associated with the second virtual machine.

20. The method of claim 11, wherein the second virtual machine records and updates the first attribute and second attribute representing attributes of a display device that is associated with the second virtual machine.

21. A non-transitory computer readable storage medium storing instructions that are executable by a first computing device that includes one or more processors to cause the first computing device to perform a method for optimizing motion of a pointer associated with a pointing device, the method being performed by a first virtual machine provided by a hypervisor provided by the first computing device, and comprising:
   determining whether at least one of a first attribute and a second attribute representing attributes of a display device that are associated with a second virtual machine were recorded by the second virtual machine;
   responsive to the determination, obtaining at least one of the first attribute and the second attribute, or at least one of a default first attribute and default second attribute;
   determining, based on at least one of the first attribute, the second attribute, the default first attribute, and the default second attribute, at least one of a first scaling factor and a second scaling factor,
   optimizing a motion of the pointer based on at least one of the first scaling factor and the second scaling factor; and
   providing information corresponding to the optimized motion of the pointer to the second virtual machine.

22. The computer readable storage medium of claim 21, wherein the first virtual machine is a control virtual machine; and wherein the second virtual machine is a guest virtual machine executed by the first computing device or a guest virtual machine executed by a second computing device.

23. The computer readable storage medium of claim 21, wherein the first attribute corresponds to a horizontal screen dimension or horizontal screen resolution and the second attribute corresponds to a vertical screen dimension or a vertical screen resolution.

24. The computer readable storage medium of claim 21, wherein determining at least one of the first scaling factor and the second scaling factor further comprises:
   dividing a constant by the first attribute to obtain the first scaling factor and dividing the constant by the second attribute to obtain the second scaling factor; or
   multiplying the constant with the division of the first attribute by the second attribute to obtain the second scaling factor, the constant being the first scaling factor; or
   multiplying the constant with the division of the second attribute by the first attribute to obtain the first scaling factor, the constant being the second scaling factor.

25. The computer readable storage medium of claim 21, wherein optimizing the motion of the pointer further comprises:

scaling, based on at least one of the first scaling factor and the second scaling factor, a plurality of relative coordinates associated with the pointer, the pointer representing position information generated by the pointing device that is associated with the second virtual machine.

26. The computer readable storage medium of claim 25, wherein the plurality of relative coordinates are Cartesian coordinates or polar coordinates.

27. The computer readable storage medium of claim 25, wherein scaling the plurality of relative coordinates further comprises at least one of:

multiplying the first scaling factor with corresponding horizontal components of the plurality of relative coordinates; and multiplying the second scaling factor with corresponding vertical components of the plurality of relative coordinates.

28. The computer readable storage medium of claim 25, wherein optimizing the motion of the pointer further comprises:

generating a plurality of absolute coordinates based on the plurality of relative coordinates, the absolute coordinates representing absolute movements of the pointer with respect to a reference point.

29. The computer readable storage medium of claim 21, wherein optimizing the motion of the pointer further comprises:

generating a plurality of absolute coordinates based on a plurality of relative coordinates associated with the pointer, the pointer representing position information generated by the pointing device that is associated with the second virtual machine.

30. The computer readable storage medium of claim 21, wherein the second virtual machine records and updates the first attribute and second attribute representing attributes of a display device that is associated with the second virtual machine.

* * * * *